United States Patent
Ishizawa et al.

(10) Patent No.: US 6,641,912 B2
(45) Date of Patent: Nov. 4, 2003

(54) PHOTOCURABLE PRESSURE-SENSITIVE ADHESIVE COMPOSITION AND ITS SHEET

(75) Inventors: Hideaki Ishizawa, Osaka (JP); Munehiro Hatai, Osaka (JP); Masakazu Nakata, Osaka (JP); Motohiro Yagi, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 09/936,578

(22) PCT Filed: Jan. 10, 2001

(86) PCT No.: PCT/JP01/00061
§ 371 (c)(1),
(2), (4) Date: Sep. 13, 2001

(87) PCT Pub. No.: WO01/51581
PCT Pub. Date: Jul. 19, 2001

(65) Prior Publication Data
US 2003/0040550 A1 Feb. 27, 2003

(30) Foreign Application Priority Data
Jan. 13, 2000 (JP) .......................................... 2000-004682
Jan. 13, 2000 (JP) ............................................ 2000-4683

(51) Int. Cl.$^7$ ........................... C09J 167/00; B32B 7/10
(52) U.S. Cl. ............. 428/345; 428/355 R; 428/355 EP; 522/134; 522/141; 522/142; 522/143; 522/146; 522/168; 522/170; 522/179
(58) Field of Search ................. 522/31, 32, 66, 522/141, 142, 143, 146, 168, 170, 179, 134; 528/272, 308, 308.6; 428/345, 355 EP, 355 EN, 413, 480, 482, 355 R

(56) References Cited

U.S. PATENT DOCUMENTS

| | | | | | |
|---|---|---|---|---|---|
| 4,059,715 A | * | 11/1977 | Pletcher | ...................... | 428/349 |
| 4,920,182 A | * | 4/1990 | Manser et al. | ............... | 525/438 |
| 5,436,063 A | * | 7/1995 | Follett et al. | .................. | 442/73 |
| 5,900,473 A | * | 5/1999 | Acevedo et al. | ............. | 528/271 |
| 6,136,398 A | * | 10/2000 | Willett et al. | ............... | 428/41.3 |
| 6,254,954 B1 | * | 7/2001 | Bennett et al. | ............ | 428/41.8 |

FOREIGN PATENT DOCUMENTS

| | | | |
|---|---|---|---|
| EP | 1026218 | * | 8/2000 |
| WO | WO 98/38262 | * | 9/1998 |
| WO | WO 99/67343 | * | 12/1999 |

* cited by examiner

*Primary Examiner*—Susan W. Berman
(74) *Attorney, Agent, or Firm*—Townsend & Banta

(57) ABSTRACT

An objective is to provide a pressure-sensitive adhesive composition which shows pressure-sensitive adhesive properties at ordinary temperature, has the ability to cure upon irradiation and after photocure exhibits improved bond strength relative to high-polarity adherends, such as PET, PVC and metals, and improved moist heat-resisting bond strength, a pressure-sensitive adhesive and a pressure-sensitive adhesive sheet obtained from the aforementioned pressure-sensitive adhesive composition.

A photocurable pressure-sensitive adhesive composition containing a polyester resin having a glass transition temperature (Tg) of 25° C. or above, a cationically photopolymerizable compound and a cationic photoinitiator.

20 Claims, No Drawings

PHOTOCURABLE PRESSURE-SENSITIVE ADHESIVE COMPOSITION AND ITS SHEET

TECHNICAL FIELD

The present invention relates to a photocurable pressure-sensitive adhesive composition which has pressure-sensitive adhesive properties in its ordinary state and can be cured by irradiation, and also to a sheet utilizing the same.

BACKGROUND ART

Generally, adhesives are provided in a liquid form, applied to adherends which are subsequently joined together, and allowed to solidify via vaporization of a solvent or via a reaction toward higher molecular weights so that the adherends are adhered firmly to each other. Such adhesives provide high bond strength. However, restrictions exist in handling them; an operation of applying them to adherends is troublesome, the vaporization of a solvent or the reaction is relatively time-consuming, and adherends must be somehow held in position until the adhesives solidify.

On the other hand, pressure-sensitive adhesives are basically semi-solid viscoelastic substances which appear adsorptive due to the so-called "tack" and often provided in the form of being applied on a filmed base material. Pressure-sensitive adhesives are easy to handle for their ability to be adhered to adherends by application of a light pressure. However, pressure-sensitive adhesives provide lower bond strength than adhesives.

As a so-called curable pressure-sensitive adhesive which shows both features of a pressure-sensitive adhesive and an adhesive, can be handled like a pressure-sensitive adhesive when adherends are combined, and initiates curing upon application of heat or radiation to develop high bond strength, Japanese Patent Kohyo No. Hei 10-508636 proposes a photocurable pressure-sensitive adhesive composition which comprises a combination of a free-radically polymerizable polymer, a cationically photopolymerizable compound and a cationic photoinitiator.

However, when an acrylic resin, representative of free-radically polymerizable polymers, is used, the resulting composition when cured shows insufficient bond strength to adherends composed of polyethylene terephthalate (PET), polyvinyl chloride (PVC), a metal or the like. This lowers reliability of such a composition when used to combine these adherends.

A polyester resin may be considered to be an effective alternative to improve adhesion to PTE, PVC, a metal or the like. However, there is a possibility that polyester resins when placed under high temperature and high moisture conditions may reduce bond strength via hydrolysis of esters. This provides concerns about adhesive reliability.

DISCLOSURE OF THE INVENTION

It is an object of the present invention to provide a photocurable pressure-sensitive adhesive composition which shows pressure-sensitive adhesive properties in its ordinary state, initiates curing upon exposure to an active energy radiation, shows good adhesion to high-polarity adherends such as PET, PVC and metals, and exhibits superior heat-resisting and moisture-resisting bond strength, and also to provide a pressure-sensitive adhesive and a pressure-sensitive adhesive sheet both derived from the composition.

In accordance with a broad aspect of a first invention of this application, a photocurable pressure-sensitive adhesive composition is provided which contains a polyester resin having a glass transition temperature of 25° C. or above, a cationically photopolymerizable compound and a cationic photoinitiator.

In a particular aspect of the first invention, a polyester resin having a glass transition temperature of below 25° C. is further contained. In a more limited aspect, the polyester resin having a glass transition temperature of 25° C. or above accounts for 50 or higher % of the total weight of the polyester resin.

In another particular aspect of the first invention, the cationically photopolymerizable compound is incorporated in the amount of 10–100 parts by weight, based on 100 parts by weight of the polyester resin.

According to a broad aspect of a second invention, a photocurable pressure-sensitive adhesive composition is provided which contains a polyester resin having a glass transition temperature of 25° C. or above, a cationically photopolymerizable compound, a cationic photoinitiator and a rosin comprised chiefly of abietic acid.

In a particular aspect of the second invention, the rosin is either hydrogenated or disproportionated.

In a more limited aspect of the second invention, the rosin is incorporated in the form of a rosin ester obtained by reacting carboxyl groups present in the rosin with an epoxy-containing compound.

In accordance with a broad aspect of a third invention, a photocurable pressure-sensitive adhesive composition is provided which contains a polyester resin, a cationically photopolymerizable compound and a cationic photoinitiator, with a polycarboxylic acid constituting the polyester resin being an aromatic ring-containing polycarboxylic acid.

According to a broad aspect of a fourth invention, a photocurable pressure-sensitive adhesive composition is provided which contains a polyester resin, a cationically photopolymerizable compound and a cationic photoinitiator as essential components, with the polyester resin being a resin containing an ether bond in a molecule.

In a particular aspect of the fourth invention, the ether bond is an ether bond derived from polytetramethylene ether glycol.

In accordance with a fifth invention, a photocurable pressure-sensitive adhesive sheet is provided comprising any of the pressure-sensitive adhesive compositions according to the first through third inventions.

The present invention is below described in detail.

The photocurable pressure-sensitive adhesive composition in accordance with the first invention contains a polyester resin with a glass transition temperature of 25° C. or above, a cationically photopolymerizable compound and a cationic photoinitiator as essential components. The photocurable pressure-sensitive adhesive composition of the first invention permits easy application since it contains a polyester resin, a cationically photopolymerizable compound and a cationic photoinitiator as essential components and shows pressure-sensitive properties at ordinary temperature. Also, when irradiated, the cationically photopolymerizable compound initiates curing so that a crosslinked structure is formed. The incorporation of molecular chains of the polyester resin in the structure is effective to develop high bond strength.

Also, the photocurable pressure-sensitive adhesive composition of the first invention, because of incorporation of the polyester resin, shows good adhesion to substrates such as PET, PVC and metals and, because of improved hydrolysis resistance due to its high glass transition temperature, shows superior moist heat-resisting adhesive properties.

Further, since the cure reaction occurs in the form of cationic photopolymerization initiated by irradiation, it is allowed to proceed even after the irradiation is stopped and thus provides a firm adhesion between the adherends.

The polyester resin with a glass transition temperature of 25° C. or above is not particularly specified. Examples of such polyester resins include those available in the trade under the designations VYLON 103, 200, 240, 280, 290, 296 and 600 (manufactured by Toyobo Co., Ltd.) and ELEETHER UE-3200, 3201, 3203, 3210, 3215, 3216, 3240, 3250, 3500, 3600, 3620, 3660 and 3690 (manufactured by Unitika Ltd.). The glass transition temperature of the polyester resin needs to be 25° C. or above. If below 25° C., there is an increasing tendency that hydrolysis is caused to go proceed under high temperature and high moisture conditions. If the glass transition temperature is too high, the adhesive composition when formed into a sheet or tape may show the increased hardness to result in the reduced bond strength. The preferred glass transition temperature is 30–100° C. The above-listed polyester resins may be used alone or in any combination thereof.

Preferably, a polyester resin having a glass transition temperature of below 25° C. is further incorporated in the polyester resin in the first invention to modify or adjust properties and/or performances of the resulting pressure-sensitive adhesive composition depending upon the end use contemplated. In particular, the additional use of the polyester resin having a glass transition temperature of below 25° C. improves pressure-sensitive adhesive properties of the pressure-sensitive adhesive composition while in an ordinary state, resulting in the increased applicability and bond strength after cure. The polyester resin having a glass transition temperature of below 25° C. is preferably maintained not to exceed 50% of the total weight of the polyester resins. If stated otherwise, in the case where the polyester resin having a glass transition temperature of below 25° C. is used in combination with the polyester resin having a glass transition temperature of 25° C. or above, the latter preferably accounts for 50 or higher % of the total weight of all the polyester resins. If the polyester resin having a glass transition temperature of below 25° C. is added in the amount that exceeds 50% of the total weight of polyester resins, a possibility arises that the moist heat resistance of the photocurable pressure-sensitive adhesive and sheet will decrease.

The type of the polyester resin with a glass transition temperature of below 25° C. is not particularly specified. Examples of such polyester resins include those available in the trade under the designations VYLON 220, 300, 550, 630, 650 and 820 (manufactured by Toyobo Co., Ltd.), LP-011, 033, 035 and 044 (manufactured by Nippon Synthetic Chem. Ind. Co., Ltd.), ELEETHER UE-2300, 2330, 3220, 3221 and 3400 (manufactured by Unitika Co., Ltd.) and ER-6510, 6520, 6550, 6570, 6610, 6620, 6640, 6650, 6680, 6700, 6800, 6810, 6820, 8100, 8101, 8105, 8106, 8107, 8120, 8200, 8600 and others (manufactured by Unitika Ltd.). The above-listed polyester resins with glass transition temperatures of below 25° C. may be used alone or in any combination thereof.

In the first invention, the photocurable pressure-sensitive adhesive composition contains a cationically photopolymerizable compound as an essential component. Any cationically photopolymerizable compound can be used if it has at least one cationically photopolymerizable, functional group in a molecule. Examples include compounds having at least one cationically photopolymerizable, functional group, such as an epoxy, oxetane, hydroxyl, vinyl ether, episulfide or ethylene imine group, in a molecule. The molecular weight of the cationically photopolymerizable compound is not particularly specified and it may exist in the form of a monomer, oligomer or polymer. The above-listed cationically photopolymerizable compounds may be used alone or in any combination.

Preferred among those cationically photopolymerizable compounds is an epoxy-containing compound with at least one epoxy group in a molecule. Examples of epoxy-containing compounds include, but not limited to, bisphenol based epoxy resins such as bisphenol A based epoxy resins, e.g., EPICOAT 1001 and 1002 (manufactured by Yuka-Shell Epoxy Co., Ltd.), and bisphenol F based epoxy resins; phenol novolak based epoxy resins; cresol novolak based epoxy resins; multi-functional epoxy resins such as glycidyl ether based epoxy resins and glycidyl amine based epoxy resins; addition polymers of epoxy monomer and oligomers such as glycidylated polyester, glycidylated urethane and glycidylated acryl; flexible epoxy resins with a flexible structure introduced into a molecule, such as RIKA RESIN BPO-20E, 60E, 80E, 100E and 180E (manufactured by Shin-Nippon Rika Co., Ltd.); and the like. These epoxy resins may be used alone or in combination.

Preferably, the cationically photopolymerizable compound is incorporated in the amount of 10–100 parts by weight, based on 100 parts by weight of the aforementioned polyester resin. If the amount of the cationically photopolymerizable compound exceeds 100 parts by weight, the resulting composition tend to show the reduced adhesion to high-polarity substrates such as of PET, PVE and metals. If it falls below 10 parts by weight, the involvement of the cationic polymerization in crosslinking may decrease in proportion to reduce heat resistance and other properties of the composition after cure.

The photocurable pressure-sensitive adhesive composition in accordance with the first invention contains a cationic photoinitiator as an essential component. The cationic photoinitiator may be of an ionic or nonionic, photochemical acid generation type. Examples of cationic photoinitiators of the ionic, photochemical acid generation type include, but not limited to, onium salts such as aromatic diazonium salts, aromatic halonium salts and aromatic sulfonium salts; organometallic complexes such as an iron-arene complex, titanocene complex, arylsilanol-aluminum complex; and the like. Specific examples include ADEKA OPTOMER SP-150 and 170 (manufactured by Asahi Denka Industry Co., Ltd.), UVE-1014 (manufactured by General Electric Company), CD-1012 (manufactured by Sartomer Co.) and the like. The above-listed cationic photoinitiators may be used alone or in combination.

Examples of cationic photoinitiators of the nonionic, photochemical acid generation type include, but not limited to, nitrobenzyl esters, sulfonic acid derivatives, phosphate esters, phenol sulfonate esters, diazonaphthoquinone, N-hydroxyimidosulfonate and the like. These may be used alone or in combination.

The amount of the cationic photoinitiator incorporated is not particularly specified, but may preferably be in the range of 0.1–10 parts by weight, based on 100 parts by weight of the aforementioned cationically photopolymerizable compound. If the cationic photoinitiator is incorporated in the amount of below 0.1 parts by weight, it is possible that cationic photopolymerization will be made to proceed insufficiently or retarded excessively.

In the present invention, an active energy radiation is used to activate the cationic photoinitiator. The active energy radiation is not particularly specified and may be in the form of a microwave, infrared ray, visible light, ultra-violet radiation, X-ray, γ-ray and the like. The use of ultraviolet radiation is preferred because it is easy to handle and provides a relatively high energy. The use of ultraviolet radiation in the wavelength region of 200–400 nm is particularly preferred. Such ultraviolet radiation can be emitted from a light source such as a high-pressure or ultrahigh-pressure mercury lamp, chemical lamp, xenon lamp, and the like.

Besides the aforestated polyester resin, cationically phopolymerizable compound and cationic photoinitiator, the photocurable pressure-sensitive adhesive composition of the first invention may further contain a tackifying resin or extender, if appropriate, within the range that does not impede the purpose of the present invention.

For example, a tackifying resin, such as a rosin resin, modified rosin resin, terpene resin, terpene-phenolic resin, aromatic modified terpene resin, C5 or C9 petroleum resin, coumarone resin or the like, may be incorporated for the purpose of improving pressure-sensitive adhesive properties of the curable pressure-sensitive adhesive of the present invention.

The photocurable pressure-sensitive adhesive composition in accordance with the second invention contains a polyester resin having a glass transition temperature of 25° C. or above, a cationically photopolymerizable compound, a cationic photoinitiator and a rosin comprised chiefly of abietic acid as essential components. The polyester resin having a glass transition temperature of 25° C. or above, cationically photopolymerizable compound and cationic photoinitiator, as used herein, are similar to those used in the first invention. Accordingly, detailed descriptions thereof are omitted here by referring to the descriptions given previously in explaining the photocurable pressure-sensitive adhesive composition in accordance with the first invention.

The photocurable pressure-sensitive adhesive composition of the second invention contains a polyester resin, a cationically photopolymerizable compound, a cationic photoinitiator and a rosin, shows good pressure-sensitive properties at ordinary temperature which permits easy application thereof and, in particular, shows improved adhesion because of the inclusion of a rosin. When the adhesive composition is exposed to a radiation, a cure reaction of the cationically photopolymerizable compound initiates to form a crosslinked structure. Incorporation of molecular chains of the polyester resin therein results in the development of high bond strength.

Also, the resistance of the composition to heat and moist heat can be increasingly stabilized when its structure is stabilized via hydrogenation, disproportionation, esterification or the like of the rosin. Further in this invention, the inclusion of the cationic photomerizable compound, such as an epoxy compound, may cause an occasion where the storage stability of the photocurable pressure-sensitive adhesive composition is reduced by a reaction between a cationic photoreactive group and a carboxyl group in the rosin. However, the esterification of the carboxyl group in the rosin results in the improved storage stability of the photocurable pressure-sensitive adhesive composition.

In the second invention, the rosin comprised chiefly of abietic acid encompasses rosins comprised chiefly of a mixture of abietic acid having tricyclic conjugated double bonds and a carboxyl group and its isomers, and also rosins derived via hydrogenation, disproportionation or esterification of the above rosins.

In view of the glass transition temperature of the polyester resin that is 25° C. or above, the rosin for use in the second invention preferably has a softening point of up to 100° C. or a glass transition temperature of up to 40° C. More preferably, it has a softening point of up to 60° C. or a glass transition temperature of up to 30° C. If the softening point of the rosin exceeds 100° C., or if the glass transition temperature of the rosin exceeds 40° C., the composition may show a reduced adherence when adherends are combined to result in the failure to develop sufficient bond strength.

The rosin for use in the second invention is not particularly specified in type, so long as it is comprised principally of abietic acid. However, rosins obtained via hydrogenation or disproportionation of the above-specified rosin are preferred. This is because hydrogenation or disproportionation improves the thermal stability and moist heat resistance of the rosin to result in the improved adhesion, heat resistance and moist heat resistance of the photocurable pressure-sensitive adhesive composition incorporating the rosin.

Also preferred for use in the second invention is a rosin ester obtained via a reaction of a carboxyl group in the rosin with an epoxy-containing compound. The rosin ester results from esterification of the rosin and shows a very low reactivity to an epoxy group as a result of a marked reduction of carboxyl groups. Accordingly, the use of the rosin ester improves adhesion and storage stability of the photocurable pressure-sensitive adhesive composition.

Such a rosin ester is desired to have an acid value of not exceeding 10 mgKOH/g. If its acid value exceeds 10 mgKOH/g, the storage stability of the photocurable pressure-sensitive adhesive composition may be lowered by a reaction between the cationically photopolymerizable compound in the composition and carboxylic acid remaining in the rosin ester.

Examples of the aforementioned rosins and rosin esters include KR-610, KE-311, KE-100, KE-656, KE-359, KE-828, KE-601, KE-615-3, KE-624 (manufactured by Arakawa Chem. Ind., Ltd.) and the like.

Besides the aforestated polyester resin, cationically photopolymerizable compound, cationic photoinitiator and rosin, the photocurable pressure-sensitive adhesive composition of the second invention may further contain a conventional tackifying resin or extender, if appropriate, within the range that does not impede the purpose of the present invention.

The photocurable pressure-sensitive adhesive composition in accordance with the third invention contains a polyester resin, a cationically photopolymerizable compound and a cationic photoinitiator. Characteristically, a polycarboxylic acid component constituting the polyester resin is aromatic ring containing polycarboxylic acid. The cationically photopolymerizable compound and cationic photoinitiator, as used herein, are basically similar to those used in the first invention. Accordingly, detailed descriptions thereof are omitted here by referring to the descriptions given previously in explaining the first invention.

The photocurable pressure-sensitive adhesive composition of the third invention contains a polyester resin, a cationically photopolymerizable compound and a cationic photoinitiator, and shows pressure-sensitive properties at ordinary temperature which permits easy application thereof. Upon exposure to a radiation, a cure reaction of the cationically photopolymerizable compound is caused to proceed and form a crosslinked structure. Incorporation of the polyester resin in the structure results in the development of high bond strength.

Due to the inclusion of the polyester resin derived from a polycarboxylic acid in the form of an aromatic ring containing polycarboxylic acid, the photocurable pressure-sensitive adhesive composition of the third invention shows superior adhesive properties and moist heat resistance.

A polyester resin is basically a polycondensation product of polycarboxylic acid and polyol. Where such a polyester resin is applied for uses that require pliability and flexibility, such as for adhesives or pressure-sensitive adhesives, the polycarboxylic acid is used generally in the form of a combination comprising aromatic ring-containing polycarboxylic acid and aliphatic polycarboxylic acid. The inventors of the present application have come to complete the third invention based on the finding that the exclusion of the aliphatic polycarboxylic acid and accordingly the use of the aromatic ring-containing polycarboxylic acid alone results in the improved moist heat resistance.

The aromatic ring-containing polycarboxylic acid is not particularly specified in type if it contains an aromatic ring in a molecule. Carboxylic groups may be attached either directly or indirectly via a methylene or other group to the aromatic ring. In view of adhesive properties and moist heat resistance, preferred among such aromatic ring-containing polycarboxylic acids are aromatic polycarboxylic acids containing an aromatic ring to which carboxylic groups are directly coupled. Specific examples of such aromatic polycarboxylic acids include dicarboxylic acids such as terephthalic acid, isophthalic acid, orthophthalic acid, 2,6-naphthalene-dicarboxylic acid and sulfoisophthalic acid; and trivalent and higher valent carboxylic acids such as trimellitic acid and pyromellitic acid. The aromatic polycarboxylic acid used can be suitably chosen from those listed above depending upon the properties required for the polyester resin. The above-listed aromatic polycarboxylic acids may be used alone or in combination.

Examples of polyols include diols such as ethylene glycol, 1,2-propylene glycol, 1,4-butane diol, 1,5-pentane diol, 1,6-hexane diol and neopentyl glycol; tri- and higher-ols such as trimethylolpropane and pentaerythritol; and polyether polyols having a terminal hydroxyl group. In the third invention, the aromatic ring-containing polycarboxylic acid is used alone for the polycarboxylic acid. This makes it preferable to use linear alcohol having a large number of carbon atoms for the polyol component to improve pliability of the resulting polyester resin. The polyol used can be suitably chosen from those listed above depending upon the properties required for the polyester resin. The above-listed polyols may be used alone or in combination.

The polyester resin suitable for use in the third invention has a molecular weight generally in the range of 10,000–50,000, although not limiting.

Any polycondensation process which has been generally employed in the art can be used to synthesize the polyester resin.

The photocurable pressure-sensitive adhesive composition in accordance with the fourth invention contains a polyester resin, a cationically photopolymerizable compound and a cationic photoinitiator as essential components. Characteristically, the polyester resin is the one which contains an ether bond in a molecule. The cationically photopolymerizable compound and cationic photoinitiator are similar in type to those used in the first invention. Accordingly, details thereof are omitted here by referring to the descriptions given previously in explaining the first invention.

The photocurable pressure-sensitive adhesive composition of the fourth invention contains a polyester resin, cationically photopolymerizable compound and cationic photoinitiator and shows pressure-sensitive properties at ordinary temperature which permit easy application thereof. By irradiation, the cationically photopolymerizable compound initiates a cure reaction to form a crosslinked structure. The incorporation of the polyester resin in the structure results in the development of high bond strength.

Further, due to the inclusion of the ether bond, the photocurable pressure-sensitive adhesive composition of this invention shows the improved resistance to moist heat.

A polyester resin is basically a polycondensation product of polycarboxylic acid and polyol and suffers from concerns associated with moist heat resistance. However, the inventors of this application have come to complete this fourth invention based on the finding that the introduction of an ether bond into polyester molecules improves moist heat resistance.

The polyester resin for use in the fourth invention is obtained via polycondensation of polycarboxylic acid, ether bond-containing polyol and other optional polyols.

Such a polycarboxylic acid is similar in type to that used in the third invention. Accordingly, details thereof are omitted here by referring to the descriptions given in explaining the third invention.

Also in the fourth invention, the use of aromatic ring containing polycarboxylic acid for the above polycarboxylic acid is preferred for its ability to improve adhesion and heat resistance. Particularly preferred is aromatic polycarboxylic acid which contains carboxyl groups directly coupled to its aromatic ring.

Examples of aromatic polycarboxylic acids include di-carboxylic acids such as terephthalic acid, isophthalic acid, orthophthalic acid, 2,6-naphthalenedicarboxylic acid, paraphenylenedicarboxylic acid and sulfoisophthalic acid; tri- and higher valent carboxylic acids such as trimellitic acid and pyromellitic acid; and the like. These aromatic polycarboxylic acids may be used alone or in combination.

Also in the fourth invention, polyether polyol having a terminal hydroxyl group is used to introduce an ether bond into the polyester resin. The use of linear polyol having a large number of carbon atoms as the polyol component is preferred for its ability to improve pliability of the resulting polyester resin. Such polyols may be used alone or in combination.

Examples of polyether polyols having a terminal hydroxyl group include polytetramethylene ether glycol (PTMG), polypropylene glycol (PPG), polyethylene glycol (PEG) and the like. When the hydrolysis resistance under high temperature and high humidity conditions is taken into account, the use of more hydrophilic polyether, i.e., PTMG, is preferred.

The polyether polyol having a terminal hydroxyl group is present preferably in the amount of 5–40 mole %, more preferably in the amount of 10–20 mole %, based on a total mole of the aforementioned polycarboxylic acid and polyol which together constitute the polyester resin.

Besides the polyol used to introduce an ether bond, other polyols may also be used. Such other polyols include diols such as ethylene glycol, 1,2-propylene glycol, 1,4-butane diol, 1,5-pentane diol, 1,6-hexane diol and neopentyl glycol; tri- and higher-ols such as trimethylolpropane and pentaerythritol; and the like, for example.

Any polycondensation process which has been generally employed in the art can be used to synthesize the polyester resin for use in the fourth invention.

Techniques used to manufacture the photocurable pressure-sensitive adhesive compositions of this invention, i.e., those in accordance with the first through fourth inventions, are not special They are obtainable by mixing specified amounts of polyester resin, photopolymerizable compound, cationic photoinitiator and, if necessary, other optional additives under ordinary or elevated temperature condition by means of a mixing machine such as a homodisper, homomixer, universal mixer, planetary mixer, kneader, three roll mill or the like. Preferably, the mixing operation is performed under conditions unexposed to a radiation.

The above-obtained photocurable pressure-sensitive adhesive composition may be, in the form as it is, coated on one or both sides of a member (adherend) to be joined to another and allowed to undergo cationic polymerization and cure. Preferably, the composition is preformed into a pressure-sensitive adhesive sheet for use in the form of a photocurable pressure-sensitive adhesive sheet to ease handling and simplify operations. It is generally preferred that such a pressure-sensitive adhesive sheet is in the form of a double coated pressure-sensitive adhesive sheet. When occasion demands, it may take the form of a single coated pressure-sensitive adhesive sheet.

A sheet-form photocurable pressure-sensitive adhesive composition can be obtained by thinning the photocurable pressure-sensitive adhesive composition into a sheet using various techniques. Preferably, sheeting is achieved by coating, in the form of a sheet, the pressure-sensitive adhesive composition on a release coated, sheet-form base material by a bar, roll, gravure, extrusion or other coating process. Where the composition is present either in a solid form or high viscous liquid form which make its application in the form of a coating difficult, the composition may be reduced in viscosity before it is coated as by diluting it with a suitable solvent or melting it thermally.

The sheeted photocurable pressure-sensitive adhesive composition are pressure-sensitive at ordinary temperature. Preferably, a release sheet is provided to protect its pressure-sensitive surface to assure easy handling.

Examples of base materials on which the photocurable pressure-sensitive adhesive composition is coated in the form of a sheet, i.e., release sheet materials, include polyethylene terephthalate, polyethylene naphthalate, polyethylene, polypropylene, polycarbonate, nylon, polyallylate, polysulfone, polyether sulfone, polyether ether ketone, polyphenylene sulfide, polystyrene, polyacryl, polyvinyl chloride, triacetyl cellulose, diacetyl cellulose, cellophane and the like. These base materials are used in the form of a sheet having a thickness that preferably measures not less than 1 $\mu$m, more preferably not less than 10 $\mu$m, while not limiting. If the thickness is excessively small, they may be reduced in strength to result in breakage during use.

The thickness of the pressure-sensitive adhesive sheet in this invention is not particularly specified, but is preferably in the range of 1–2,000 $\mu$m, more preferably in the range of 10–1,000 $\mu$m. If the thickness of pressure-sensitive adhesive is below 1 $\mu$m, the adhesion of the sheet may be in some cases influenced by surface irregularities of an adherend. If it exceeds 2,000 $\mu$m, a cure time may be sometimes extended excessively.

In the present invention, the photocurable pressure-sensitive adhesive composition may be exposed to a radiation either before or after a member carrying the composition coated thereon or adhered thereto is joined to another member.

In an exemplary case where at least one member is optically transparent, the photocurable pressure-sensitive adhesive composition or sheet is coated on or adhered to the at least one member which is subsequently joined to another member, and then exposed to a radiation passing through the optically transparent member so that the photocurable pressure-sensitive adhesive composition or sheet is caused to undergo cationic photopolymerization and cure. When this procedure is utilized, it is desired that the active energy radiation be emitted immediately after the both members are joined to each other. This shortens a time required for a whole joint process. Further, when both members are joined to each other, the photocurable pressure-sensitive adhesive composition or sheet can also be exposed to heat to improve adhesion between them. Particularly where the photocurable pressure-sensitive adhesive composition excludes or contains a slight amount of a polyester resin with a glass transition temperature of below 25 degrees, the adhesive composition is preferably exposed to heat when both members are joined to each other.

Also, in the case where neither of members is optically transparent, the photocurable pressure-sensitive adhesive composition or sheet may be coated on or adhered to at least one member and then exposed to a radiation so that it is caused to undergo cationic photopolymerization and cure. The one member is thereafter joined to the other member. In order that smooth joining of the one to the other member is accomplished by such a procedure, it is desired that both members be joined to each other immediately, preferably within 10 minutes, after irradiation.

Whichever procedure is selected, curing via a cationic photopolymerization reaction at ordinary temperature of the photocurable pressure-sensitive adhesive composition or sheet completes within a short period of time. The adhesive composition when cured develops high bond strength and superior resistance to solvent, heat and water.

Also, a curing means, such as application of heat or moisture, may be used in combination with irradiation to promote a cure reaction of the photocurable pressure-sensitive adhesive composition or sheet and thereby further shorten a cure time. Particularly where the photocurable pressure-sensitive adhesive composition excludes or contains a slight amount of a polyester resin with a glass transition temperature of below 25 degrees, the curing means such as application of heat may preferably be used in combination with irradiation.

BEST MODES FOR CARRYING OUT THE INVENTION

The present invention is now described in detail by way of non-limiting examples which follow.

EXAMPLES 1–4

Comparartive Examples 1–3

The following operating procedure was utilized to prepare the photocurable pressure-sensitive adhesive composition and sheet of Example 1 according to the formulation specified in Table 1.

Preparation of Pressure-sensitive Adhesive Composition

Using a homodisper type agitation mixer (product name; Homo Disper Type-L, manufactured by Tokushu Kika Kogyo Co., Ltd.), a polyester resin, an epoxy resin, a cationic photoinitiator, and a solvent (MEK) were uniformly mixed under agitation at a rate of 3,000 rpm to obtain a photocurable pressure-sensitive adhesive composition.

Preparation of Pressure-sensitive Adhesive Sheet

The above-obtained pressure-sensitive adhesive composition was applied by a bar coater onto a release coated, 50 $\mu$m thick PET film as a base member and dried. Then, a silicone release coated, PET film as a protective film was laminated onto a surface of the pressure-sensitive adhesive composition to obtain a pressure-sensitive adhesive sheet. The resulting photocurable pressure-sensitive adhesive sheet was 100 μm thick.

Fabrication of Joined Strip

The protective film was removed from the photocurable pressure-sensitive adhesive sheet. The exposed surface of the photocurable pressure-sensitive adhesive composition was in turn laminated onto a corona treated surface of a PET film at room temperature. Next, the release coated PET film was removed and the exposed adhesive surface of photocurable pressure-sensitive adhesive compostion was irradiated with an ultraviolet radiation at a wavelength of 365 nm from an ultra high-pressure mercury lamp, which provided an energy exposure of 2,400 mJ/cm$^2$. Immediately thereafter, the irradiated surface of photocurable pressure-sensitive adhesive composition was laminated onto a corana treated surface of another PET film. The combination was then allowed to cure in an oven at 110° C. for 30 minutes to obtain a joined strip.

Evaluation

Initial Bond Strength

The joined strip was cut to a width of 10 mm to prepare a test sample. Using a tensile tester, the test sample was subjected to a T-peel test at a peel rate of 50 mm/min. The test result, together with the formulations of the pressure-sensitive adhesive composition, were shown in Table 1.

Moist Heat-resisting Bond Strength

A test sample prepared in the same manner as described above was placed in a thermo-hygrostatic oven at 85° C. and 65% RH for 3 days, and thereafter subjected to a T-peel test at a peel rate of 50 mm/min using a tensile tester. The test result is given in Table 1.

EXAMPLES 2–4

Comparative Examples 1–3

The procedure of Example 1 was repeated, except that the formulations specified in Table 1 were used, heat was not applied in the preparation of joined strips and the test samples prepared were left to stand in the 23° C. and 65% RH atmosphere for three days. The results are given in Table 1.

The compounds listed in Table 1 are as follows.

UE3500: polyester resin (product of Unitika, Tg=35° C.)
B200: polyester resin (product of Toyobo, Tg=67° C.)
UE3400: polyester resin (product of Unitika, Tg=−20° C.)
B550: polyester resin (product of Toyobo, Tg=−15° C.)
EP-828: epoxy resin (product of Yuka-Shell Epoxy)
BEO-60E: epoxy resin (product of Shin Nippon Rika)
SP-170: cationic photoinitiator (product of Asahi Denka Kogyo).

EXAMPLE 5

Comparative Example 4

The operating procedure of Example 1 was repeated using the components specified in the following Table 2 to prepare photocurable pressure-sensitive adhesive compositions and sheets. Each photocurable pressure-sensitive adhesive sheet thus obtained was used to fabricate a joined strip in the same manner as in Example 1.

The joined strips obtained were evaluated for dry (initial) bond strength and moist heat-resisting bond strength in the same manner as in Example 1. The results are given in Table 2. Also, they were evaluated for storage stability in the following manner.

Storage stability: the sheet obtained was stored at 40° C. for 1 month and thereafter measured for dry bond strength and moist heat-resisting bond strength. The results are shown in Table 2.

TABLE 2

|  |  |  | Ex. 5 | Comp. Ex. 4 |
|---|---|---|---|---|
| Pressure-Sensitive Adhesive Composition | UE3500 | (Parts by Weight) | 120 | 60 |
|  | BEO-60E |  | 40 | 40 |
|  | SP-170 |  | 1 | 1 |
|  | KE-615-3 |  | 20 | 0 |
|  | Methyl Ethyl Ketone |  | 90 | 100 |
| Initially | Dry Bond Strength | (g/cm) | 5000 | 3000 |
|  | Moist Heat-Resisting Bond Strength (After 3 Days Storage) |  | 5000 | 3000 |

TABLE 1

|  |  |  | Ex. | | | | Comp. Ex. | | |
|---|---|---|---|---|---|---|---|---|---|
|  |  |  | 1 | 2 | 3 | 4 | 1 | 2 | 3 |
| Composition | UE3500 | (Parts by Weight) | 60 | 50 | 40 |  |  | 20 |  |
|  | B200 |  |  |  |  | 50 |  |  | 20 |
|  | UE3400 |  |  | 10 | 20 |  | 60 | 40 |  |
|  | B550 |  |  |  |  | 30 |  |  | 10 |
|  | EP-828 |  |  |  |  | 10 |  |  | 35 |
|  | BEO-60E |  | 40 | 40 | 40 | 10 | 40 | 40 | 35 |
|  | SP-170 |  | 1 | 1 | 1 | 1 | 1 | 1 | 1 |
|  | Methyl Ethyl Ketone |  | 100 | 100 | 100 | 100 | 100 | 100 | 100 |
| Result | Initial Bond Strength | (g/cm) | 3000 | 2800 | 3200 | 3100 | 3000 | 3000 | 800 |
|  | Moist Heat-Resisting Bond Strength |  | 3000 | 2800 | 3100 | 3000 | 500 | 800 | — |

TABLE 2-continued

|  |  |  | Ex. 5 | Comp. Ex. 4 |
|---|---|---|---|---|
| After Storage | Dry Bond Strength | (g/cm) | 5000 | 3000 |
|  | Moist Heat-Resisting Bond Strength (After 3 Days Storage) |  | 5000 | 3000 |

All parts in Table 2 are by weight. The compounds listed in Table 2 are as follows.

UE3500: polyester resin (product of Unitika, Tg=35° C.)
BEO-60E: epoxy resin (product of Shin Nippon Rika)
SP-170: cationic photoinitiator (product of Asahi Denka Kogyo)
KE-615-3: rosin ester (product of Arakawa Chem. Ind., acid value=1 mgKOH/g)

EXAMPLE 6

Comparative Example 5

EXAMPLE 6

Preparation of Pressure-sensitive Adhesive Composition 65 parts by weight of a polyester resin (obtained via polycondensation of 25 mole % of terephthalic acid, 25 mole % of isophthalic acid, 25 mole % of ethylene glycol and 25 mole % of neopentyl glycol according to a conventional method), 35 parts by weight of an epoxy resin (RIKA RESIN BEO-60E, product of Shin Nippon Rika Co., Ltd.), 1 part by weight of a cationic photoinitiator (ADEKA OPTOMER SP170, product of Asahi Denka Co., Ltd.) and 150 parts by weight of methyl ethyl ketone were uniformly mixed under agitation at a rate of 3,000 rpm using a homodisper type agitation mixer (HOMO DISPER TYPE-L, manufactured by Tokushu Kika Co., Ltd.) to prepare a photocurable pressure-sensitive adhesive composition of Example 6.

By using the photocurable pressure-sensitive adhesive composition such obtained, a photocurable pressure-sensitive adhesive sheet and a joined strip were prepared in the same manner as in Example 1.

Comparative Example 5

65 parts by weight of an aliphatic polycarboxylic acid containing polyester resin (UE3400, product of Unitika Ltd.), 35 parts by weight of an epoxy resin (RIKA RESIN BEO-60E, product of Shin Nippon Rika Co., Ltd.), 1 part by weight of a cationic photoinitiator (ADEKA OPTOMER SP270, product of Asahi Denka Co., Ltd.) and 150 parts by weight of methyl ethyl ketone were used. Otherwise, the procedure of Example 1 was followed to prepare-a photocurable pressure-sensitive adhesive sheet. Using this photocurable pressure-sensitive adhesive sheet, a joined strip was prepared in the same manner as in Example 1.

Evaluation

Each of the joined strips obtained in Example 6 and Comparative Example 5 was placed in an oven at 110° C. for 30 minutes to cure the composition, and thereafter measured for bond strength. The measured value was recorded as initial bond strength. The joined strip after cure was placed in a thermo-hygrostatic oven at 85° C. and 95% RH. After the lapse of 3 days, bond strength was measured. The measured value was recorded as moist heat-resisting bond strength. The bond strength was measured by cutting the joined strip to a width of 10 mm and subjecting it to a T-peel test at a peel rate of 50 mm/min using a tensile tester. The results are given in Table 3.

TABLE 3

|  | Initial Bond Strength | Moist Heat-Resisting Bond Strength |
|---|---|---|
| Ex. 6 | 27.4 N/cm | 27.4 N/cm |
| Comp. Ex. 5 | 27.4 N/cm | 9.8 N/cm |

The results of Example 6 have demonstrated that the use of a polyester resin derived from aromatic ring-containing polycarboxylic acid improves moist heat-resisting properties.

EXAMPLE 7

Comparative Example 6

EXAMPLE 7

Preparation of Pressure-sensitive Adhesive Composition 80 parts by weight of a polyester resin containing an ether bond in a molecule (obtained via polycondensation of 25 mole % of terephthalic acid, 25 mole % of isophthalic acid, 17.5 mole % of ethylene glycol, 17.5 mole % of ethylene glycol adduct of bisphenol A and 15 mole % of polytetraethylene ether glycol according to a conventional method), 20 parts by weight of an epoxy resin (RIKA RESIN BEO-60E, product of Shin Nippon Rika Co., Ltd.), 1 part by weight of a cationic photoinitiator (ADEKA OPTOMER SP170, product of Asahi Denka Co., Ltd.) and 150 parts by weight of methyl ethyl ketone were uniformly mixed under agitation at a rate of 3,000 rpm using a homodisper type agitation mixer (HOMO DISPER Type-L, manufactured by Tokushu Kika Co., Ltd.) to prepare a photocurable pressure-sensitive adhesive composition.

By using the photocurable pressure-sensitive adhesive composition thus obtained, a photocurable pressure-sensitive adhesive sheet and a joined strip were prepared in the same manner as in Example 1.

Comparative Example 6

80 parts by weight of a polyester resin (UE3400, product of Unitika Ltd., polyether moieties excluded), 20 parts by weight of an epoxy resin (RIKA RESIN BEO-60E, product of Shin Nippon Rika Co., Ltd.), 1 part by weight of a cationic photoinitiator (ADEKA OPTOMER SP170, product of Asahi Denka Co., Ltd.) and 150 parts by weight of methyl ethyl ketone were used. Otherwise, the procedure of Example 1 was followed to prepare a photocurable pressure-sensitive adhesive sheet. Using this photocurable pressure-sensitive adhesive sheet, a joined strip was prepared in the same manner as in Example 1.

Evaluation

Each of the joined strips obtained in Example 7 and Comparative Example 6 was evaluated for initial bond strength and moist heat-resisting bond strength in the same manner as in Example 6. The results are given in the following Table 4.

TABLE 4

|  | Initial Bond Strength | Moist Heat-Resisting Bond Strength |
| --- | --- | --- |
| Ex. 7 | 17.6 N/cm | 17.6 N/cm |
| Comp. Ex. 6 | 17.6 N/cm | 2.0 N/cm |

The results of Example 7 have demonstrated that the use of a polyester resin having an ether bond introduced therein improves moist heat-resisting properties.

Effects of the Invention

Since the photocurable pressure-sensitive adhesive composition of the first invention contains a polyester resin having a glass transition temperature of 25° C. or above, a cationically photopolymerizable compound and a cationic photoinitiator, it exhibits pressure-sensitive properties at ordinary temperature and can be cured by irradiation to develop satisfactory bond strength relative to high-polarity adherends.

Since the photocurable pressure-sensitive adhesive composition of the second invention contains a polyester resin having a glass transition temperature of 25° C. or above, a cationically photopolymerizable compound, a cationic photoinitiator and a rosin, it exhibits good pressure-sensitive properties at ordinary temperature and can be cured by irradiation to develop satisfactory bond strength to high-polarity adherends.

Since the photocurable pressure-sensitive adhesive composition of the third invention contains a polyester resin, a cationically photopolymerizable compound and a cationic photoinitiator, with the polyester resin containing an aromatic ring-containing polycarboxylic acid constituent, it shows improved bond strength such as to PET and PVC, as well as showing improved moist heat-resisting properties.

Sine the photocurable pressure-sensitive adhesive composition of the fourth invention contains a polyester resin, a cationically photopolymerizable compound and a cationic photoinitiator, with the polyester resin having a structure into which an ether bond has been introduced, it shows improved bond strength such as to PET and PVC, as well as showing improved moist heat-resisting properties.

Also, the photocurable pressure-sensitive adhesive compositions of the first through fourth inventions, because of their improved moist heat-resisting properties, can also be used in the fields, such as electrical appliances and automobiles, where high moist heat-resisting properties are required.

Further, the photocurable pressure-sensitive adhesive sheet of the fifth invention can be made by sheeting any of the above-described photocurable pressure-sensitive adhesive compositions. Accordingly, it shows superior handleability and applicability and can provide the aforesaid effects in a simple manner.

What is claimed is:

1. A photocurable pressure-sensitive adhesive composition comprising:
    a polyester resin containing an ether bond, said polyester resin having a glass transition temperature of 25° C. or above,
    a cationically photopolymerizable compound, and
    a cationic photoinitiator.

2. The photocurable pressure-sensitive adhesive composition as recited in claim 1, further containing a polyester resin having a glass transition temperature of below 25° C.

3. The photocurable pressure-sensitive adhesive composition as recited in claim 2, wherein said polyester resin having a glass transition temperature of 25° C. or above accounts for 50 or higher % of a total weight of the aforementioned polyester resin.

4. The photocurable pressure-sensitive adhesive composition as recited in claim 3, wherein said cationic photopolymerizable compound is incorporated in the amount of 10–100 parts by weight, based on 100 parts by weight of said polyester resin.

5. A photocurable pressure-sensitive adhesive sheet characterized as comprising the pressure-sensitive adhesive composition as recited in claim 3.

6. The photocurable pressure-sensitive adhesive composition as recited in claim 2, wherein said cationic photopolymerizable compound is incorporated in the amount of 10–100 parts by weight, based on 100 parts by weight of said polyester resin.

7. A photocurable pressure-sensitive adhesive sheet characterized as comprising the pressure-sensitive adhesive composition as recited in claim 2.

8. The photocurable pressure-sensitive adhesive composition as recited in claim 1, wherein said cationic photopolymerizable compound is incorporated in the amount of 10–100 parts by weight, based on 100 parts by weight of said polyester resin.

9. A photocurable pressure-sensitive adhesive sheet characterized as comprising the pressure-sensitive adhesive composition as recited in claim 8.

10. The photocurable pressure-sensitive adhesive composition as recited in claim 1, wherein said ether bond is an ether bond derived from polytetramethylene ether glycol.

11. A photocurable pressure-sensitive adhesive composition characterized as containing a polyester resin having a glass transition temperature of 25° C. or above, a cationically photopolymerizable compound, a cationic photoinitiator and a rosin comprised chiefly of abietic acid.

12. The photocurable pressure-sensitive adhesive composition as recited in claim 11, wherein said rosin is hydrogenated or disproportionated.

13. A photocurable pressure-sensitive adhesive sheet characterized as comprising the pressure-sensitive adhesive composition as recited in claim 12.

14. The photocurable pressure-sensitive adhesive composition as recited in claim 11, wherein said rosin is a rosin ester produced by reacting a carboxyl group present in the rosin with an epoxy-containing compound.

15. A photocurable pressure-sensitive adhesive sheet characterized as comprising the pressure-sensitive adhesive composition as recited in claim 11.

16. A photocurable pressure-sensitive adhesive composition containing:
    a polyester resin,
    a cationically photopolymerizable compound, and
    a cationic photoinitiator,
    wherein the polycarboxylic acid constituting the polyester resin is an aromatic ring-containing polycarboxylic acid.

17. A photocurable pressure-sensitive adhesive sheet characterized as comprising the pressure-sensitive adhesive composition as recited in claim 1.

18. A photocurable pressure-sensitive adhesive sheet characterized as comprising the pressure-sensitive adhesive composition as recited in claim 14.

19. A photocurable pressure-sensitive adhesive sheet characterized as comprising the pressure-sensitive adhesive composition as recited in claim 16.

20. A photocurable pressure-sensitive adhesive sheet characterized as comprising the pressure-sensitive adhesive composition as recited in claim 10.

* * * * *